Patented Apr. 18, 1933

1,904,145

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGENATION OF AROMATIC COMPOUNDS

No Drawing. Application filed March 9, 1929, Serial No. 345,882, and in Germany March 13, 1928. Renewed August 24, 1932.

The present invention relates to the halogenation of carbocyclic compounds in chlorosulphonic acid. Throughout this specification the percentages and parts indicated are by weight.

Numerous methods are known for introducing halogen into organic compounds, but all these methods are uneconomic, inasmuch as even with the reaction proceeding quantitatively only half of the halogen employed is utilized, the other half being lost in the form of halogen hydride according to the general formula:

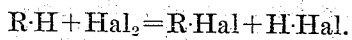

$$R \cdot H + Hal_2 = R \cdot Hal + H \cdot Hal.$$

The said losses, however, can often be avoided to a great extent and the halogen about completely utilized in the reaction mixture by an addition to the reaction mixture of suitable oxidizing agents, such as chromates, nitrous acid and the like, in such amounts and forms as had previously been determined by experiments to be the best. In some cases greater losses of halogen can be avoided in the aforesaid manner, but the said methods mostly have the disadvantage, that undesired side-reactions readily take place due to the oxidizing agent added, as it is very difficult to introduce the said agent into the reaction mixture in the same amount as halogen hydride is formed. The said difficulties are quite obvious when brominating in the presence of chlorine, which, per se, is particularly adapted for the oxidation of hydrogen bromide. If too much of the chlorine be passed into the reaction mixture, or the chlorine be introduced too quickly, undesired by-products will be formed due to the unavoidable chlorination and oxidation. If on the contrary less chlorine as is necessary be introduced into the reaction mixture, hydrogen bromide is wasted.

We have now found that one or several hydrogen atoms attached to the nucleus of a carbocyclic, and preferably aromatic compound can be replaced by halogen, which term, wherever used in the description and the appended claim, is meant to comprise chlorine and bromine, without any appreciable loss by the formation of halogen hydride, when carrying out the halogenation in chlorosulphonic acid in the presence of a halogen carrier. The said method allows the production of carbocyclic halogen compounds by acting on one molecular proportion of a carbocyclic compound with less than one mole molecular proportion of halogen for each atom of halogen to be introduced into the said compound. In many cases even the calculated amounts of halogen i. e. as many atomic proportions of halogen as halogen atoms are to be introduced into each molecule of the carbocyclic compound, are sufficient, in particular when it is intended to produce compounds of a low halogen content. If, however, carbocyclic compounds of a high halogen content are to be produced an excess of halogen over the calculated amount is suitably employed, since at the higher temperatures necessary for the production of highly halogenated products, it cannot always be avoided that small amounts of halogen escape from the reaction mixture, which, however, may again be condensed and reintroduced into the reaction mixture, if desired. An excess of about from 10 to 20 per cent of halogen over the calculated amount will be sufficient nearly in all cases, but an excess up to about 50 per cent will sometimes be advisable. A precise intimation in which cases the employment of an excess of halogen over the calculated amount is advisable cannot be given, since it largely depends on the nature of the compound treated, the intended degree of halogenation, the specific halogen carrier employed and the like. Thus, for example, nearly all carbocyclic compounds can be halogenated to a certain stage with the calculated amounts of halogen. This stage, however is not the same with all compounds, but varies, in some cases it is mono-halogen stage, in others the di-, or trihalogen stage. When the halogenation is to be carried beyond this stage, the temperature must be increased and it will then mostly be advisable to employ an excess of halogen.

From the aforesaid it will be obvious that precise figures for the temperatures to be employed cannot be given either, but it may be said that they do not greatly differ from those usually employed for halogenation by means of at least one molecular proportion of halogen for each halogen atom to be introduced. Thus, for example, many halogenations proceed already at ordinary temperature, or even while cooling. The aforesaid will be more fully explained in the following examples with respect to pyranthrone by illustrating under which conditions from mono- to hexahalogen pyranthrones are obtained according to our process. The pyranthrones containing more than three halogen atoms are new and form valuable intermediate products for the preparation of vat dyestuffs, in particular the tetrahalogenpyranthrones. We are aware that it has already been proposed to produce a tetrabromopyranthrone which is a vat dyestuff, by acting on pyranthrone with a large excess of bromine under pressure in the absence of a solvent. The tetrabromopyranthrone thus obtained readily dissolves in 96 per cent sulphuric acid of about 20° C. to a pure blue solution and furnishes with an alkaline hydrosulphite solution a red violet vat. Cotton is dyed from the vat containing, for example, 2 per cent of the dyestuff, calculated on the amount of cotton, at 60° C. orange-red shades. Contrary thereto, the tetrabromopyranthrone obtainable according to our invention is practically insoluble in 96 per cent sulphuric acid of about 20° C., but comparatively readily soluble in oleum and chlorosulphonic acid to a blue solution with a greenish tinge and furnishes under the abovementioned conditions very faint red-brown shades of mean appearance from a vat from which the bulk of the leuco compound separates out as the corresponding alkali metal salt which cannot be brought again into solution even when raising the temperature. It is therefore useless as vat dyestuff, but a valuable intermediate product for the preparation of new vat dyestuffs.

It results from the nature of the reaction that the process described is of particular interest when producing uniform halogen compounds of a certain degree of halogenation. It is not necessary to employ the free halogens in the process, but agents liberating halogens may be used as well in the corresponding amounts, for instance sulphuryl chloride or sulphur halides, and these halogenating agents are to be regarded as equivalents of the free halogens for the purposes of the present invention.

If higher halogenated carbocyclic compounds are to be produced according to our process, attention is to be given to the fact that the chlorosulphonic acid may react with the substance under treatment, for example, by oxidizing, sulphonating, or chlorinating the substance. If such side-reactions are to be avoided not too high temperatures should be employed, but the treatment rather be prolonged. On the other hand such reactions may even sometimes be desirable as they allow, for instance, to produce oxygenated halogen compounds from hydrocarbons in one operation, or to produce halogenated sulphonic acids or highly chlorinated or chlorinated and brominated compounds in one operation. Thus, for example, when brominating perylene by means of the calculated amount of bromine in chlorosulphonic acid in the presence of iodine brominated perylene quinone is directly obtained.

As halogen carriers those usually employed are suitable, in particular sulphur, iodine, antimony, arsenic, bismuth, mercury or compounds thereof, such as for instance the amalgams. The amounts thereof preferably added vary in accordance with their efficiency and the reactivity of the carbocyclic compound to be halogenated, but do not exceed in general 10 per cent calculated on the amount of the substance subjected to halogenation.

The process is applicable to all carbocyclic compounds, for example hydrocarbons, such as benzene, naphthalene, anthracene, or hydrogenated benzene, naphthalene, anthracene, or pyrene, perylene, benzanthrene, their homologues and substitution products, for instance, their nitro, amino and halogen derivatives. Furthermore, oxygen-containing carbocyclic compounds of which the corresponding hydrocarbons are not yet known may be halogenated in the aforesaid manner, for instance, dibenzanthrones, the different kinds of dianthrones, such as ms-benzdianthrones, ms-naphthodianthrones, allo-ms-naphthodianthrones, ms-anthradianthrones, pyranthrones, anthanthrones, and the like, or dibenzpyrenequinone, or compounds which are isomeric to the aforesaid substances.

The following examples will further illustrate the nature of the present invention, but the invention is not restricted thereto.

*Example 1*

40 parts of pyranthrone are dissolved in 400 parts of chlorosulphonic acid, while stirring, 8.8 parts of bromine being then introduced into the said solution at ordinary temperature after the addition of 1 part of sulphur. The reaction mixture is stirred at ordinary temperature for a short time and the temperature is then raised to between 30 and 40° C. until all of the bromine has been taken up. The reaction mixture is then allowed to cool, diluted with 200 parts of concentrated sulphuric acid, poured into water, the whole being then boiled up, if desired, and filtered by suction. The monobromopyranthrone obtained is a red-orange paste and an orange powder when dry, dissolves to a blue solution in concentrated sulphuric acid and dyes cotton excellently fast orange shades from a red-violet vat.

Example 2

40.6 parts of pyranthrone are dissolved at between 20 and 30° C. in 400 parts of chlorosulphonic acid, while stirring. 17 parts of bromine are then run into the said solution to which 2 parts of iodine have been added, the whole being then stirred for a short time between 30 and 35° C. and the temperature is then raised to between 40 and 50° C. and kept at the said latter temperature until all of the bromine has been taken up. The reaction mixture is then allowed to cool and worked up as described in Example 1. The dibromopyranthrone obtained is an orange-red paste and an orange powder when dry, dissolves to a blue solution in concentrated sulphuric acid, and dyes cotton from a red-violet vat excellently fast orange shades.

Other halogen carriers, such as for instance mercury, bismuth or antimony may be added instead of iodine.

Example 3

2 parts of sulphur and 2 parts of antimony are added to a solution of 40.6 parts of pyranthrone in 400 parts of chlorosulphonic acid and 25 parts of bromine are run into the said solution at between 20 and 30° C., whereupon the temperature is slowly raised to between 50 and 60 C., the reaction mixture being stirred at the said temperature until all of the bromine has been taken up. The reaction mixture is then allowed to cool and worked up as described in Example 1. The reaction product which is obtained in a quantitative yield in the form of an orange-red paste is a tribromopyranthrone according to analysis, dissolves to a blue solution in concentrated sulphuric acid and dyes vegetable fibre very fast orange-red shades.

Example 4

40.6 parts of pyranthrone are dissolved in 400 parts of chlorosulphonic acid and 32 parts of bromine are added to the solution at ordinary temperature after the addition of 4 parts of sulphur. The reaction mixture is then slowly warmed to between 65 and 70° C. and maintained at the said temperature until all bromine is taken up. The reaction mixture is then allowed to cool and poured into ice-cold water whereby the tetrabromopyranthrone separates out. It is an orange-red powder which dissolves in concentrated sulphuric acid only with difficulty to a blue solution and forms a valuable intermediate product for the production of new dyestuffs due to its reactivity.

Example 5

40.6 parts of pyranthrone, 400 parts of chlorosulphonic acid, 4 parts of iodine and 39 parts of bromine are slowly warmed to between 65 and 70° C. until all of the bromine has been consumed by the reaction mixture. The reaction mixture is allowed to cool and worked up as described in Example 4. The product is identical with that obtained according to Example 4.

Example 6

20 parts of bromine are dropped at ordinary temperature into a solution of 20 parts of pyranthrone in 200 parts of chlorosulphonic acid to which 2 parts of antimony have been added. The temperature is then slowly raised to between 65 and 70° C., which temperature is maintained until the reaction is complete. The reaction mixture is then worked up as described in Example 4. The tetrabromopyranthrone obtained exhibits the same properties as that described in Example 4.

Example 7

40.6 parts of pyranthrone are dissolved in 400 parts of chlorosulphonic acid. 56 parts of bromine are run into the said stirred solution, kept at between 20 and 30° C., after the addition of 4 parts of iodine. After the bromine has been added the reaction mixture is slowly warmed to between 65 and 70° C. and kept at about the said temperature, which, however, should not rise above 75° C., until the bulk of the bromine has been taken off. The reaction mixture is then allowed to cool and worked up as described in Example 1. The reaction product, a pentabromopyranthrone according to analysis, a quantitative yield of which is obtained, is a scarlet paste, dissolves in oleum to a blue solution and dyes cotton from a violet vat orange-red shades of very good fastness. It may also be employed as pigment dyestuff.

Example 8

Pentabromomonochloropyranthrone is obtained by completing the bromination described in the foregoing example at between 80 and 90° C. The said pyranthrone forms a scarlet paste and a red powder when dry, dissolves in chlorosulphonic acid or oleum, difficulty in hot concentrated sulphuric acid, to a blue solution and exhibits properties similar to those of the pentabromopyranthrone described in Example 7.

Still higher halogenated reaction products are obtained at higher reaction temperatures.

Other halogen carriers, for instance sulphur, antimony and moreover selenium, manganese, molybdenum, nickel together with sulphur or iodine may be employed instead of iodine.

Example 9

160 parts of bromine are dissolved in 400 parts of chlorosulphonic acid, 4 parts of iodine being then added. The solution is then cooled to about 5° below 0° C. and 40 parts of pure dry benzene are then dropped in, while stirring. After the bulk of the bromine has been taken off, the reaction mixture is allowed to slowly warm to between 20 and 30°C., stirring at said temperature being continued until the remaining bromine has been completely consumed, the reaction mixture being then worked up as described in Example 1. The reaction product of which about 190 parts are obtained is a colorless powder crystallizing from benzene or from a mixture of benzene and alcohol in compact colorless needles consisting mainly of tetrabromobenzene besides penta- and hexabromobenzene.

When employing less bromine, benzenes containing less bromine, when employing more bromine, mainly hexabromobenzene are obtained.

Example 10

400 parts of bromine are dissolved in 1000 parts of chlorosulphonic acid, 10 parts of iodine are then added and 92 parts of dry toluene are run into the said solution, kept at from 5 to 10° below 0° C., while thoroughly stirring. The reaction mixture is then allowed to warm slowly to 20 to 30° C. and stirring is continued until all of the bromine is taken up, the reaction mixture being then worked up as described in Example 1. The bulk of the reaction product may also be recovered by filtering it off by suction. The reaction product, excellent yields of which are obtained, consists mainly of pentabromotoluene according to analysis and crystallizes from benzene in colorless needles melting at about 280° C.

Other halogenating catalysts, such as for instance sulphur or antimony may be employed instead of iodine. When bringing less bromine than stated above to the reaction toluene containing less bromine is obtained.

Bromo derivatives of xylene are obtained in a similar manner, also higher methylated benzenes and the other alkylbenzenes, further biphenyl and its derivatives as well as naphthalene, anthracene and phenanthrene can be brominated in the said manner.

Example 11

8.8 parts of bromine are introduced at ordinary temperature into a stirred solution of 33.2 parts of 3.4.8.9-dibenzopyrene-5.10-quinone in 300 parts of chlorosulphonic acid to which 3 parts of iodine have been added, whereupon the temperature is slowly raised to 60° C., stirring being continued until all of the bromine has been taken up. The reaction mixture is then allowed to cool and worked up as described in Example 1.

The reaction product, a quantitative yield of which is obtained, is an orange powder and according to analysis a monobromo derivative. It dissolves in concentrated sulphuric acid to a violet solution and dyes cotton from red vat orange-yellow shades of excellent fastness.

When employing 17 parts of bromine instead of 8.8 parts thereof and raising the temperature to between 70 and 75° C. the dibromo derivative is obtained.

The monobromo-4.5.8.9-dibenzopyrene-3.10-quinone, obtained in an analogous manner, dyes cotton red shades.

Example 12

30 parts of bromine are introduced into a stirred solution of 46 parts of pure dibenzanthrone in 460 parts of chlorosulphonic acid to which 4 parts of antimony have been added. The temperature is then raised to between 60 and 65° C. and stirring continued until the bulk of the bromine employed is taken up. The reaction product recovered in the usual way is a tribromodibenzanthrone, of which about 70 parts are obtained, dissolves in concentrated sulphuric acid to a violet solution and dyes cotton from a violet-blue vat excellently fast marine blue shades.

By employing 40 parts of bromine tetrabromodibenzanthrone, by employing 8 or 20 parts of bromine, mono- or dibromodibenzanthrone respectively is obtained in an analogous manner.

Bromoisodibenzanthrones are obtained by employing isodibenzanthrone instead of dibenzanthrone. The said bromoisodibenzanthrones dissolve to green solutions in concentrated sulphuric acid and dye cotton from a blue vat strong clear violet shades of excellent fastness.

Example 13

50 parts of sulphurylchloride are run into a stirred solution of 92 parts of dibenzanthrone in 920 parts of chlorosulphonic acid to which 1 part of iodine and 1 part of selenium have been added. The temperature is then raised to 60 to 65° C. and kept at the said temperature until all of the sulphurylchloride is taken up. The reaction mixture is then allowed to cool and worked up as described in Example 1.

The reaction product, a tetrachlorodibenzanthrone according to analysis, is obtained in a quantitative yield and in a state of high purity, dissolves to a violet solution in concentrated sulphuric acid and dyes cotton very fast red-violet shades from a blue-violet vat.

Tetrachloroisodibenzanthrone is obtained from isodibenzanthrone in an analogous manner and dyes cotton very clear violet shades with a more reddish tinge.

Example 14

9 parts of bromine are introduced into a stirred solution of 22.3 parts of 2-aminoanthraquinone in 220 parts of chlorosulphonic acid maintained at between 20 and 30° C. to which 1.2 parts of sulphur have been added. The temperature is then raised to 80° C. and stirring continued until all of the bromine has been taken up, whereupon the reaction mixture is allowed to cool. The reaction product, a monobromo-2-aminoanthraquinone, according to analysis, of which between 30 and 31 parts are obtained, is an orange powder dissolving to a yellow solution in concentrated sulphuric acid.

1-aminoanthraquinone and also the aminobenzanthrones can be brominated in an analogous manner. Likewise amines of compounds having a high molecular weight, such as for instance, aminopyranthrone, aminoanthanthrone, aminodibenzopyrenequinones, aminodibenzanthrones, amino-allo-ms-naphthodianthrones can quantitatively be converted into corresponding bromo derivatives in the manner described.

Example 15

45 parts of mononitropyranthrone are dissolved in 450 parts of chlorosulphonic acid and 1 part of sulphur is added to the said solution, while stirring.

9 parts of bromine are run into the said stirred solution at ordinary temperature, the mixture being then warmed to between 60 and 65° C. and stirring continued until all of the bromine is taken up. The reaction mixture is then allowed to cool and worked up as usual. The mononitromonobromopyranthrone, a quantitative yield of which is obtained, is a yellow-brown powder crystallizing in yellow-orange needles dissolving to a violet solution in concentrated sulphuric acid and is a valuable intermediate product for the preparation of new dyestuffs.

Other nitro compounds, for instance those corresponding to the amines mentioned in the foregoing example, can be converted into the corresponding bromonitro derivatives in an analogous manner.

Example 16

43.5 parts of monomethoxypyranthrone, prepared by acting on monohydroxypyranthrone with the methylester of p-toluene sulphonic acid in trichlorobenzene, are dissolved at 0° C. in 435 parts of chlorosulphonic acid. 11 parts of bromine are dropped into the said solution to which 2 parts of sulphur have previously been added, the temperature being maintained for about one hour at 0° C. In order to complete the reaction stirring is continued at ordinary temperature until the formation of the dyestuff is complete. The reaction mixture is poured onto ice after dilution with sulphuric acid and the reaction product is filtered by suction. The monomethoxymonobromopyranthrone thus obtained is a blue-red powder dissolving to a red-blue solution in sulphuric acid and dyes cotton blue-red shades from a violet hydrosulphite vat.

Example 17

10 parts of bromine are introduced into a solution of 45 parts of monomethoxypyranthrone, prepared by acting on monohydroxypyranthrone in trichlorobenzene with the ethylester of p-toluene sulphonic acid, in 450 parts of chlorosulphonic acid maintained at 0° C. to which 4 parts of iodine have been added. The reaction mixture is stirred at ordinary temperature until a sample of the reaction product dyes cotton blue-red shades which is the case after some hours. The reaction mixture is worked up as usual and the dyestuff obtained, a red powder with a bluish tinge, dissolves to a red-blue solution in concentrated sulphuric acid and dyes cotton blue-red shades from a violet vat.

Example 18

48.4 parts of omega-chloroethoxypyranthrone, obtainable by acting on monohydroxypyranthrone with the chloroethylester of p-toluene sulphonic acid are dissolved in 480 parts of chlorosulphonic acid and acted upon with 10 parts of bromine as described in Example 17 after the addition of 1 part of sulphur and 1 part of iodine. The omega-chloroethoxymonobromopyranthrone thus obtained is a bluish-red powder dyeing cotton fast claret-red shades from a violet vat.

Example 19

10 parts of bromine are introduced into a solution of 33.6 parts of monomethoxyanthanthrone, obtainable for instance by the action of the methylester of p-toluene sulphonic acid on monohydroxyanthanthrone in nitrobenzene, in 330 parts of chlorosulphonic acid to which 3 parts of iodine have been added and maintained at 0° C. The further treatment is carried out as described in Example 17 and the reaction mixture is worked up as usual. The dyestuff, monomethoxymonobromoanthanthrone, dissolves to a green solution in sulphuric acid, crystallizes from nitrobenzene in long red needles and dyes cotton red shades of excellent fastness against light and atmospheric influences.

Example 20

18 parts of bromine are slowly dropped into a solution of 30.6 parts of anthanthrone in 300 parts of chlorosulphonic acid to which 3 parts of iodine have been added and the solution is warmed to between 60 and 65° C.

After 4 hours the reaction mixture is allowed to cool, diluted with sulphuric acid, poured onto ice and the reaction product filtered by suction. The dibromoanthanthrone thus obtained is an orange-red powder, dissolves to a green solution in sulphuric acid and dyes the vegetable fibre brillant red-orange shades from a violet vat.

*Example 21*

27 parts of bromine are introduced into a stirred solution of 40.6 parts of allo-ms-naphthodianthrone in 400 parts of chlorosulphonic acid, maintained at between 20 and 30° C., to which 4 parts of sulphur have been added. Thereupon the reaction mixture is warmed to between 40 and 50° C., the said temperature being maintained until all of the bromine has been taken up. After cooling the reaction mixture is worked up as usual. The tribromo-allo-ms-naphthodianthrone, giving an excellent yield, is a scarlet paste and a red powder when dry, dissolves to a green solution in concentrated sulphuric acid and dyes cotton from a violet vat brillant strong scarlet shades.

*Example 22*

180 parts of bromine are run into a stirred solution of 404 parts of ms-anthradianthrone in 4000 parts of chlorosulphonic acid, maintained at between 20 and 30° C., to which 25 parts of iodine have been added, whereupon the temperature is raised to 60 to 65° C. and stirring continued until all of the bromine has been taken up. After cooling, the reaction mixture is worked up as usual and the reaction product is obtained in an excellent yield, which, according to analysis, is a dibromo-ms-anthradianthrone forming an orange paste and an orange powder when dry, dissolves to a violet-blue solution in concentrated sulphuric acid and dyes cotton excellently fast orange-yellow shades.

*Example 23*

38 parts of ms-benzodianthrone, dissolved in 400 parts of chlorosulphonic acid, are acted upon with 20 parts of bromine at 0° C. after the addition of 2 parts of sulphur. The reaction mixture is stirred at between 5 and 10° C. until the bulk of the bromine has been taken up, is then warmed to between 30 and 40° C. for a short time, allowed to cool and worked up as usual. The dibromo-ms-benzodianthrone obtained is a yellow paste dissolving to a blue-green solution in concentrated sulphuric acid and dyes cotton from a green vat clear golden yellow shades.

The dibromo derivative of 2,2'-dimethyl-ms-benzodianthrone is obtained in a similar manner.

*Example 24*

23 parts of benzanthrone are dissolved in 200 parts of chlorosulphonic acid, while stirring. After the addition of 2 parts of sulphur, 8.8 parts of bromine are run into the said solution which is then slowly warmed to between 40 and 50° C. which temperature is maintained until all of the bromine has been taken up, whereupon the reaction mixture is allowed to cool and worked up as described in Example 1. The reaction product obtained, a monobromobenzanthrone according to analysis, is a yellow powder crystallizing from glacial acetic acid in compact needles.

When employing a larger amount of bromine higher brominated benzanthrones are obtained. Bromoderivatives of anthraquinone and its derivatives are obtained in a similar manner.

*Example 25*

17 parts of bromine are run into a solution of 43 parts of Bz.Bz'-dimethoxypyranthrone in 500 parts of chlorosulphonic acid, maintained at 0° C., to which 2 parts of sulphur have been added, whereupon the reaction mixture is warmed to between 30 and 40° C. and stirred until all of the bromine has been taken off. After cooling, the reaction mixture is worked up as usual. The dibromo-Bz.Bz'-dimethoxypyranthrone obtained is an orange-red paste, dissolves to a blue solution in concentrated sulphuric acid and dyes cotton strong clear yellowish-brown shades of very good fastness from a violet vat.

*Example 26*

17 parts of bromine are run into a solution of 21 parts of phenanthrenequinone in 200 parts of chlorosulphonic acid to which 2 parts of sulphur have been added, whereupon the solution is warmed to between 45 and 50° C. and stirred until all of the bromine has been taken up. The reaction mixture is then allowed to cool and worked up as usual. The reaction product is dibromophenanthrenequinone according to analysis.

*Example 27*

25.2 parts of perylene are introduced, while stirring, at ordinary temperature into a solution of 20 parts of bromine and 2.5 parts of iodine in 250 parts of chlorosulphonic acid, and the mixture is stirred for 2 hours at 35 to 40° C., then warmed to 65 to 70° C. and maintained at this temperature until the bulk of bromine is taken up. The reaction mixture is then allowed to cool, diluted with 125 parts of concentrated sulphuric acid and worked up as usual. The dibromoperylenequinone is obtained in the form of a brown-yellow paste becoming pure yellow by a treatment with an alkaline hypochlorite solution and forms a brown yellow powder when dry, dissolving to a violet solution in concentrated sulphuric acid and dyeing cotton brown-yellow shades from a violet vat.

The reaction product is not only a dyestuff, but also a valuable intermediate product for the preparation of new vat dyestuffs.

*Example 28*

160 parts of bromine are dissolved in 500 parts of chlorosulphonic acid and 10 parts of iodine are added. 80 parts of cyclohexane are then slowly run in at between 20 and 30° C., cooling being applied, if necessary. After all cyclohexane has been added, the mass is heated for a short time to about 60 to 70° C. and allowed to cool. Thereafter it is diluted with 250 parts of 96 per cent sulphuric acid and poured into ice water. The separated reaction product is filtered off by suction. The crude product, which according to analysis consists of a dibromo derivative, crystallizes from cyclohexane or glacial acetic acid in strong, colorless needles.

What we claim is:—

As a new article of manufacture tetrabromopyranthrone forming an orange red powder, practically insoluble in 96 per cent sulphuric acid of about 20° C., readily soluble in oleum and chlorosulphonic acid to a blue solution with a greenish tinge, forming a blue violet vat with an alkaline hydrosulphite solution at 60° C., from which the bulk of the leuco compound separates out as the corresponding alkali metal salt which cannot be brought into solution by raising the temperature, cotton being dyed from the said vat faint red brown shades.

In testimony whereof we have hereunto set our hands.

MAX ALBERT KUNZ.
KARL KOEBERLE.
ERICH BERTHOLD.